United States Patent
Niehaus et al.

(10) Patent No.: US 12,294,467 B2
(45) Date of Patent: May 6, 2025

(54) PROFILE CABLE SWITCHING

(71) Applicant: Dematic Corp., Grand Rapids, MI (US)

(72) Inventors: Chad A. Niehaus, Brookfield, WI (US);
Ronald W. David, Sparta, MI (US);
Brian K. Doyle, Wayland, MI (US);
Kraig L. Rotman, Zeeland, MI (US)

(73) Assignee: Dematic Corp., Grand Rapids, MI (US)

( * ) Notice: Subject to any disclaimer, the term of this patent is extended or adjusted under 35 U.S.C. 154(b) by 3 days.

(21) Appl. No.: 17/983,453

(22) Filed: Nov. 9, 2022

(65) Prior Publication Data

US 2023/0145122 A1 May 11, 2023

Related U.S. Application Data

(60) Provisional application No. 63/277,218, filed on Nov. 9, 2021.

(51) Int. Cl.
*H04L 12/10* (2006.01)

(52) U.S. Cl.
CPC .................................. *H04L 12/10* (2013.01)

(58) Field of Classification Search
None
See application file for complete search history.

(56) References Cited

U.S. PATENT DOCUMENTS

| | | | |
|---|---|---|---|
| 6,842,123 B1 | 1/2005 | Fujita et al. | |
| 2009/0043939 A1 | 2/2009 | Fuessl et al. | |
| 2017/0025773 A1* | 1/2017 | Englaro | H01R 12/721 |
| 2022/0384967 A1* | 12/2022 | Eder | H01R 4/2437 |

FOREIGN PATENT DOCUMENTS

| | | | | |
|---|---|---|---|---|
| DE | 102009044990 A1 | 7/2011 | | |
| DE | 102014225871 A1 | 6/2015 | | |
| EP | 2778811 A1 * | 9/2014 | | G05B 19/042 |
| GB | 2587253 A * | 3/2021 | | H01R 24/64 |

OTHER PUBLICATIONS

International Search Report and Written Opinion from corresponding Patent Cooperation Treaty (PCT) Application No. PCT/IB22/60787, completed Jan. 23, 2023.

* cited by examiner

*Primary Examiner* — Ario Etienne
*Assistant Examiner* — Mohammad Yousuf A. Mian
(74) *Attorney, Agent, or Firm* — Gardner, Linn, Burkhart & Ondersma LLP

(57) ABSTRACT

A network module configured to provide switched auxiliary (AUX) power for E-stop system functionality in a network system. The network module includes a switching module and a controller. The switching module is configured to control the passage of power through a switched AUX cable for E-stop functionality. The switching module is configured to receive an unswitched AUX cable and the switched AUX cable. The controller is communicatively coupled to a communications cable. The controller is configured to control the switching actions of the switching module as defined by switching instructions received via the communications cable.

21 Claims, 9 Drawing Sheets

PROFILE CABLE SWITCHING

CROSS REFERENCE TO RELATED APPLICATIONS

This application claims the filing benefits of U.S. provisional application, Ser. No. 63/277,218, filed Nov. 9, 2021, which is hereby incorporated by reference herein in its entirety.

FIELD OF THE INVENTION

The present invention is directed to network systems, and in particular to ASi-type cables and inter-connected modules, e.g., controllers, input devices, and output devices.

BACKGROUND OF THE INVENTION

Industrial systems, with sensors, actuators and other output devices, and controllers are commonly interconnected via communication networks. One such example networking system is the actuator sensor interface (ASi) used in various automation systems. The ASi networking system is designed to interconnect input devices (e.g., ON/OFF switches and sensors), output devices (e.g., actuators), and logic/controller modules in manufacturing and process applications. ASi compliant systems can interconnect the devices using just two-conductor wire cables.

SUMMARY OF THE INVENTION

Embodiments of the present invention provide systems and methods for power switching (e.g., emergency stop switching) without the use of costly and time-consuming cable terminations at multiple devices. The network module of the present invention is configured to provide switched auxiliary (AUX) power for emergency stop ("E-stop") system functionality in a network system. The network module comprises a controller module and a switching module. The controller module is configured to control the switching actions of the switching module. The switching module is configured to control the passage of power through a switched AUX cable. The switching module is configured to receive an unswitched AUX cable and a switched AUX cable. The switching module is further configured to control the passage of power from the unswitched AUX cable to the switched AUX cable.

In a network module of the present invention, the network module is configured to provide switched auxiliary (AUX) power for E-stop system functionality in a network system. The network module includes a switching module and a controller module. The switching module is configured to control the passage of power through a switched AUX cable for E-stop functionality. The switching module is configured to receive an unswitched AUX cable and the switched AUX cable. The controller module is communicatively coupled to a communications cable. The controller module is configured to control the switching actions of the switching module as defined by switching instructions received via the communications cable.

In an aspect of the present invention, the controller module is configured to receive switching instructions for controlling the switching module via a communications cable that passes through the network module.

In another aspect of the present invention, the unswitched AUX cable and the switched AUX cable are both coupled to the switching module via respective connection modules. One or more of the connection modules coupling the unswitched AUX cable and the switched AUX cable to the switching module may be part of the switching module or physically separated from the switching module. The communications cable is coupled to the controller module via another connection module. In a further aspect, the connection modules are configured to couple cables to the respective modules via insulation displacement connections.

In a further aspect of the present invention, a method for providing switched auxiliary (AUX) power for E-stop system functionality in a network system includes providing a switching module. Switching actions of the switching module are controlled via signals received from a communications cable. The switching module receives an unswitched AUX cable and a switched AUX cable. The method also includes controlling the passage of power from the unswitched AUX cable to the switched AUX cable.

The unswitched AUX cable is configured to pass through the network module. The switched AUX cable originates in the switching module and extends outward from the network module.

At least one of the unswitched AUX cable, the switched AUX cable, and the communications cable are actuator sensor interface (ASi) cables.

In a further aspect of the present invention, the switching module comprises one or more relays, each relay configured to control the passage of power through the switched AUX cable.

Thus, a switching module of a network system of the present invention is configured to provide switched auxiliary (AUX) power for E-stop system functionality in the network system. An exemplary network module is configured to receive network cables (e.g., ASi profile network cables) and to couple to them using insulation displacement connections. The exemplary network module receives a communications cable and an unswitched AUX cable, as well as originating a switched AUX cable. The exemplary network module includes a controller module and a switching module. The controller module is configured to control the passage of power through the switched AUX cable by controlling the passage of power from the unswitched AUX cable to the switched AUX cable. The switching module is configured to control the passage of power through the switched AUX cable via control signals received from the controller module. The exemplary insulation displacement connectors allow for an efficient coupling of signals/power to internal components without requiring the additional hardware and wiring needed to physically land the network cables in the network module.

These and other objects, advantages, purposes and features of the present invention will become apparent upon review of the following specification in conjunction with the drawings.

DESCRIPTION OF THE PREFERRED EMBODIMENTS

The present invention will now be described with reference to the accompanying figures, wherein numbered elements in the following written description correspond to like-numbered elements in the figures.

Methods and systems of the present invention provide switched auxiliary (AUX) power for a safety-rated output bus (E-stop functionality) through the uses of network-based safety functionality (via a safety controller), and the use of a generic power bus, without the use of costly mechanical wire terminations and wire pulls. Thus, such an exemplary system may provide for E-stop signal switching onto a switched bus system without the use of costly and time-consuming wire terminations at multiple devices (and associated locations). Safety systems require some combination of input devices (E-stop pull cords, light curtains, etc.) to be connected to a logic unit (e.g., controller, such as a processor or micro-processor) through either E-stop wiring or redundant safety rated protocols. This logic unit evaluates the E-stop input devices to determine when it is safe to turn on the corresponding output devices (via a switched power bus).

Figure 1:
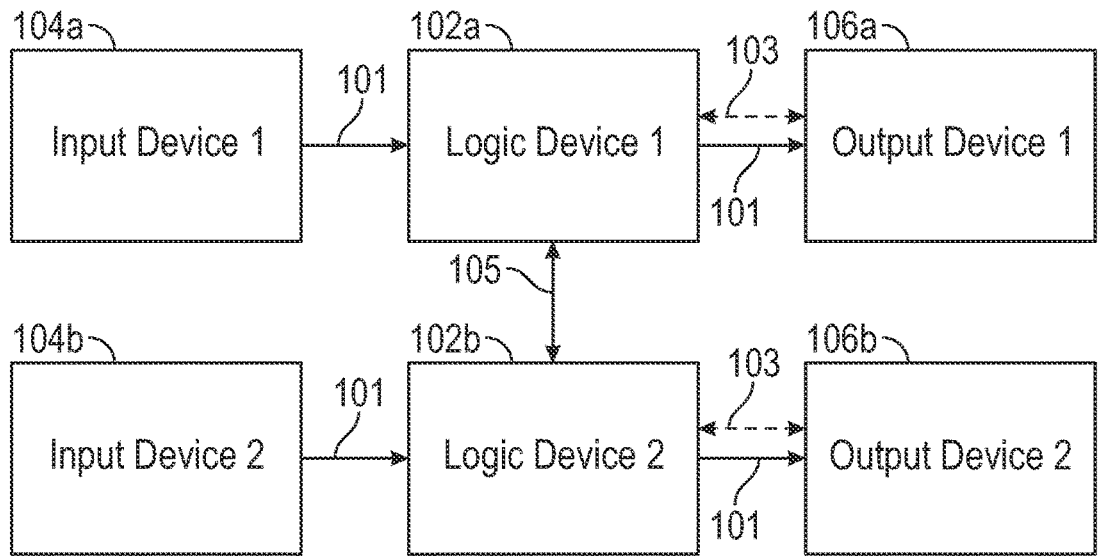
FIG. 1 is a block diagram illustrating the interconnection of components via a network system in accordance with the present invention.

FIG. 1 illustrates an exemplary network 100 for monitoring interconnected input/output devices and for detecting faults. A pair of logic units 102a, 102b are interconnected with input devices 104a, 104b and output devices 106a, 106b, respectively. As described herein, such logic units 102, 102b may comprise a processor or micro-controller, a memory, input/output devices, required circuitry, and software. Such input devices can include, for example, input switches, sensors, and other similar devices configured to input control signals, monitor control or sensor signal outputs, and/or measure signal levels (e.g., sensor outputs). The output devices can include, for example, actuators, motors, and other similar devices configured to perform an instructed motion or action. The input devices 104a, 104b and the output devices 106a, 106b are interconnected with the logic units 102a, 102b, respectively, via interconnecting means 101. In one exemplary embodiment, the interconnecting means 101 includes an ASi network or a similar network system. In another embodiment, the interconnecting means is a network system that includes wiring configured to carry data and control signals between modules (e.g., input/output devices, logic devices or controllers, distribution modules or relays, E-Stop modules with switched auxiliary power, and control modules). As illustrated in FIG. 1, the logic devices 102a, 102b are also configured to provide fault detection 103 of the output devices 106a, 106b. The logic devices 102a, 102b are also configured to perform cross monitoring 105 of each other. The wiring/cabling (i.e., the interconnecting means 101) necessary for interconnecting the components of the network 100 (and performing the desired monitoring and fault detection) requires some combination(s) of series and parallel wiring/cabling. For example, in one embodiment, an exemplary ASi network cable is configured as a flat, asymmetric two-wire flat cable, where the wiring is stripped and landed inside the several modules (e.g., input/output devices, logic devices, distribution modules, E-Stop modules with switched auxiliary power, and control modules) of the system.

Figure 2:
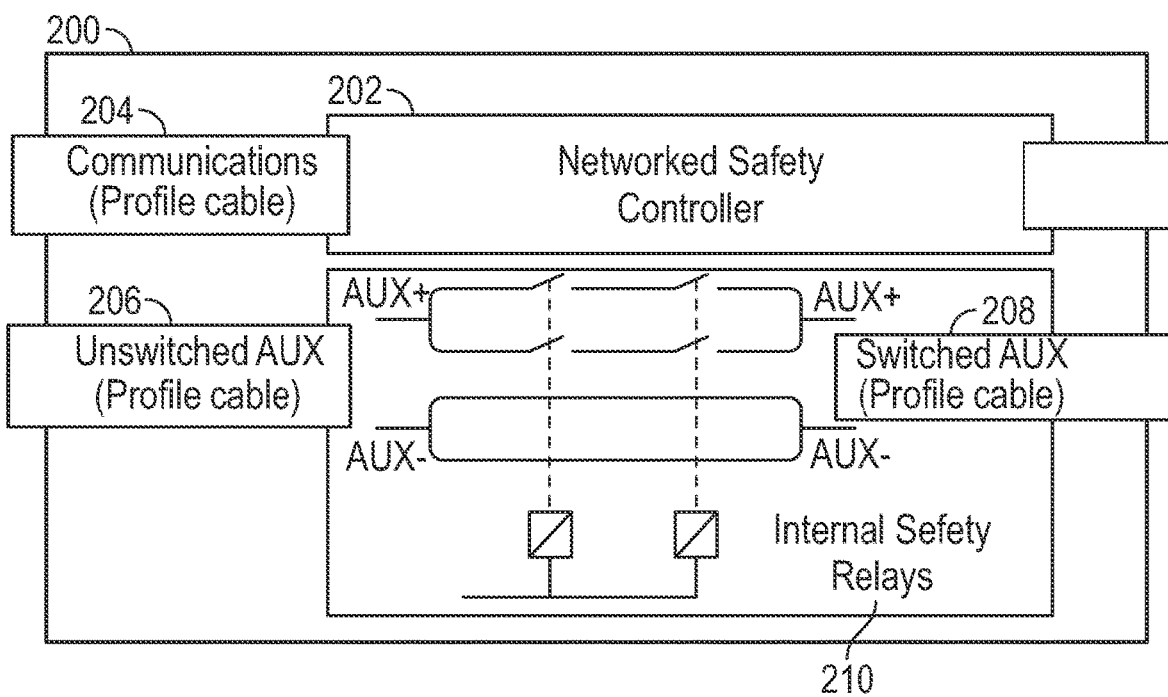
FIG. 2 is a block diagram illustrating an exemplary switching module for a network module of a network system in accordance with the present invention.

FIG. 2 illustrates an exemplary network module 200 configured to provide a safety-rated output bus (e.g., an ASi network switching module or other similar network interconnect providing a switched power output) through the use of a networked safety controller 202 that provides the desired network-based safety functionality, and also allows the use of a generic power bus (e.g., an unswitched power bus). As illustrated in FIG. 2, the networked safety controller 202 (comprising a processor or micro-controller, memory input/output devices, required circuitry, and software), communicatively coupled to a communications cable 204, is configured to control the passage of power from an unswitched AUX cable 206 (an unswitched power bus) to a switched AUX cable 208 (a switched power bus). The switched AUX cable 208 may be configured as a switched E-Stop power bus (i.e., a switched AUX cable coupled to a fail-safe control switch that when actuated causes the operation of an associated process or equipment to be shut down or stopped via the switched power bus).

The networked safety controller 202 is configured to control the passage of power from the unswitched AUX cable 206 to the switched AUX cable 208 via internal safety relays 210. The network module 200 is configured to couple to the communications cable 204, the unswitched AUX cable 206, and the switched AUX cable 208 via, for example, insulation displacement connections. The exemplary network module 200 uses a generic power bus (the unswitched AUX cable 206) which passes through the network module 200 to originate the switched AUX cable 208 without any end terminations or complex wiring. The networked safety controller 202 controls the internal safety relays 210 (of the networked safety controller 200), via control signals, in response to signals (e.g., E-stop control signals) received via the communications cable 204.

Figure 3A:
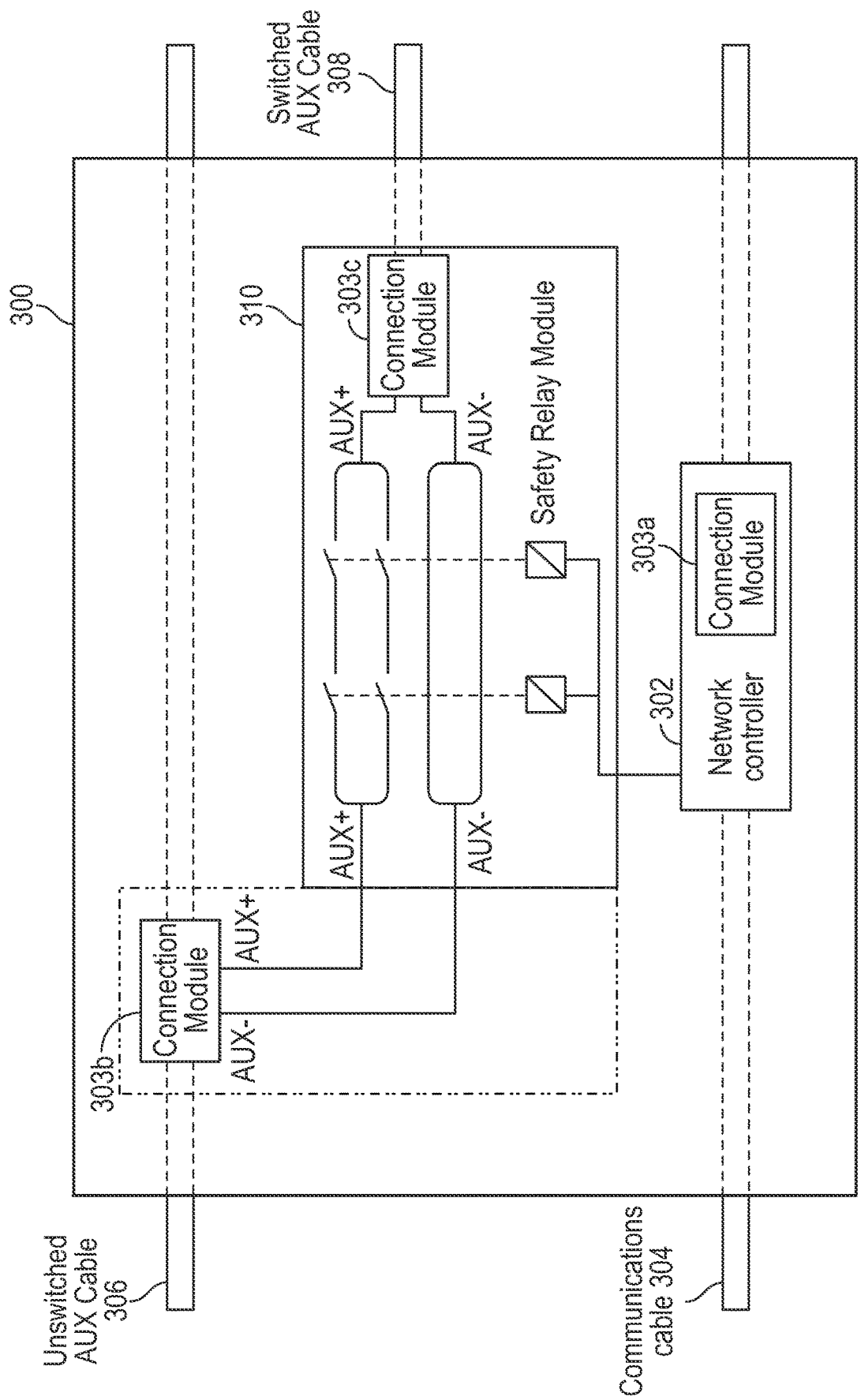
FIG. 3A is a block diagram of another exemplary switching module for a network system in accordance with the present invention.

As illustrated in FIG. 3A, an exemplary network module 300 is configured to use a generic, unswitched AUX cable 306 (such as the unswitched AUX cable 206), which passes through the network module 300 via insulation displacement connection means (e.g., connection module 303). That is, each connection module 303a, 303b, 303c comprises at least one insulation displacement connection means for connecting or coupling to a corresponding cable 304, 306, or 308, respectively. The network module 300 includes a safety relay module 310 with a plurality of relays that act upon the unswitched AUX cable 306 to originate a switched AUX cable 308 that receives its power from the unswitched AUX cable 306. As illustrated in FIG. 3A, the safety relay module 310, via its relays, controls the passage of power from the unswitched AUX cable 306 to the switched AUX cable 308. Such switching may also include E-stop switching functionality. A network controller 302 controls the switching actions of the safety relay module 310 as defined by switching instructions received from a communications cable 304. As discussed herein, the network controller 302 comprises a processor or micro-controller, memory, input/output devices, required circuitry, and software. As illustrated in FIG. 3A, the communications cable 304 is coupled to the network controller 302 via a connection module 303a.

Figure 4:
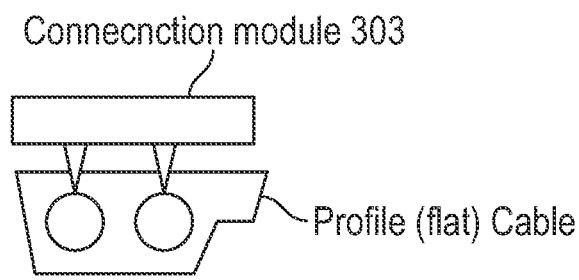
FIG. 4 is a block diagram illustrating an exemplary connection module coupling to a profile (flat) cable in accordance with the present invention.

The unswitched AUX cable 306 and the switched AUX cable 308 are coupled to the safety relay module 310 via a pair of connection modules 303b, 303c. As illustrated in FIG. 4, in one embodiment, the connection modules 303 are configured to provide insulation displacement connections to individual wires of the profile (flat) cables. As illustrated in FIG. 3A, the connection modules 303b, 303c (for coupling the unswitched AUX cable 306 and the switched AUX cable 308) may be either implemented as part of the relay module 310 or separately.

Figure 3B:
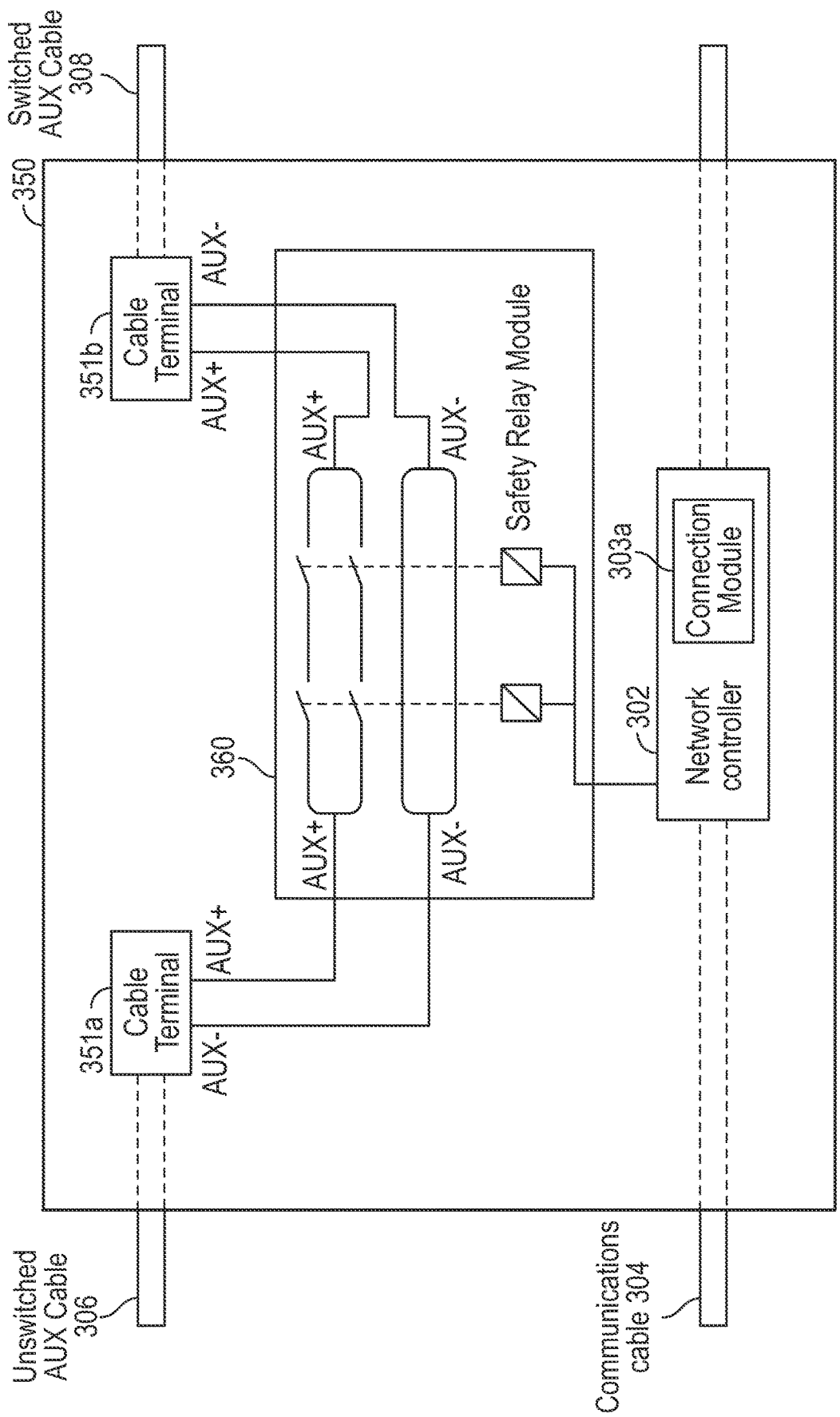
FIG. 3B is a block diagram of a conventional switching module for a network system.

An alternative network module 350, illustrated in FIG. 3B, requires cable terminals 351a, 351b (see FIG. 5) for physically coupling the unswitched AUX cable 306 and the switched AUX cable 308 to a respective input and output of a relay module 360 comprising a plurality of relays. The network module 350 also requires the use of additional connections and wiring to mechanically and electrically couple the unswitched AUX cable 306 and the switched AUX cable 308 to the cable terminals 351a, 351b, and to couple the cable terminals 351a, 351b to the relay module 360. In other embodiments, the relay module 360 may be external to the network module 350, or internal to the network module 350 but with the connection terminal(s) to the switched AUX cable 308 external to the network module 350. Similar to the network module 300, the network module 350 includes a network controller 302 that controls the switching actions of the safety relay module 360 as defined by switching instructions received from a communications cable 304. The network controller 302 of the network module 350 likewise comprises a processor or micro-controller, memory, input/output devices, required circuitry, and software. As illustrated in FIG. 3B, the communications cable 304 is coupled to the network controller 302 via a connection module 303a, which like the connection modules 303 discussed with respect to FIG. 3A also comprises insulation displacement connection means.

Figure 5:
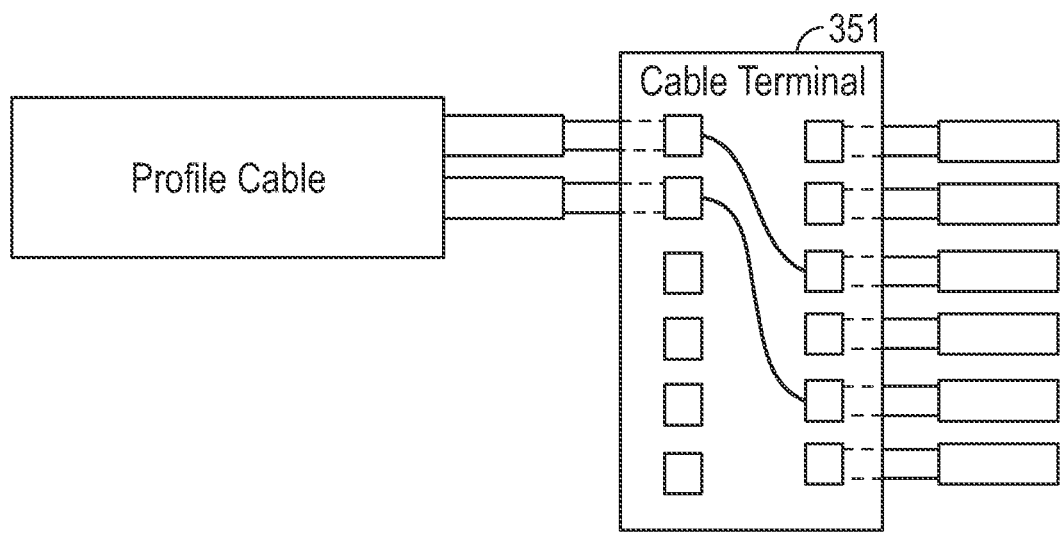
FIG. 5 is a block diagram of an exemplary cable terminal for mechanically landing profile cables and other interconnecting cables.

While FIG. 4 illustrates an exemplary connection module 303 utilizing insulation displacement means or connectors to make electrical contact with the wires of a profile (flat) cable, FIG. 5 illustrates the use of a conventional cable terminal 351. As discussed herein, the connection module 303 comprises contacts configured to pierce the insulative shield around a cable (e.g., a flat profile cable). When the connection module 303 is mechanically pressed against the cable, sharpened points of the contacts will be pressed into and through the insulative shielding to make electrical contact with the cable. As illustrated in FIG. 5, the wires of a profile cable have been exposed, stripped back, and landed onto respective terminals of the cable terminal 351. FIG. 5 illustrates a variety of cables landed on the terminals of the cable terminal 351 with a variety of jumper cables used to interconnect certain ones of the cables landed on the cable terminal 351.

Figure 6:
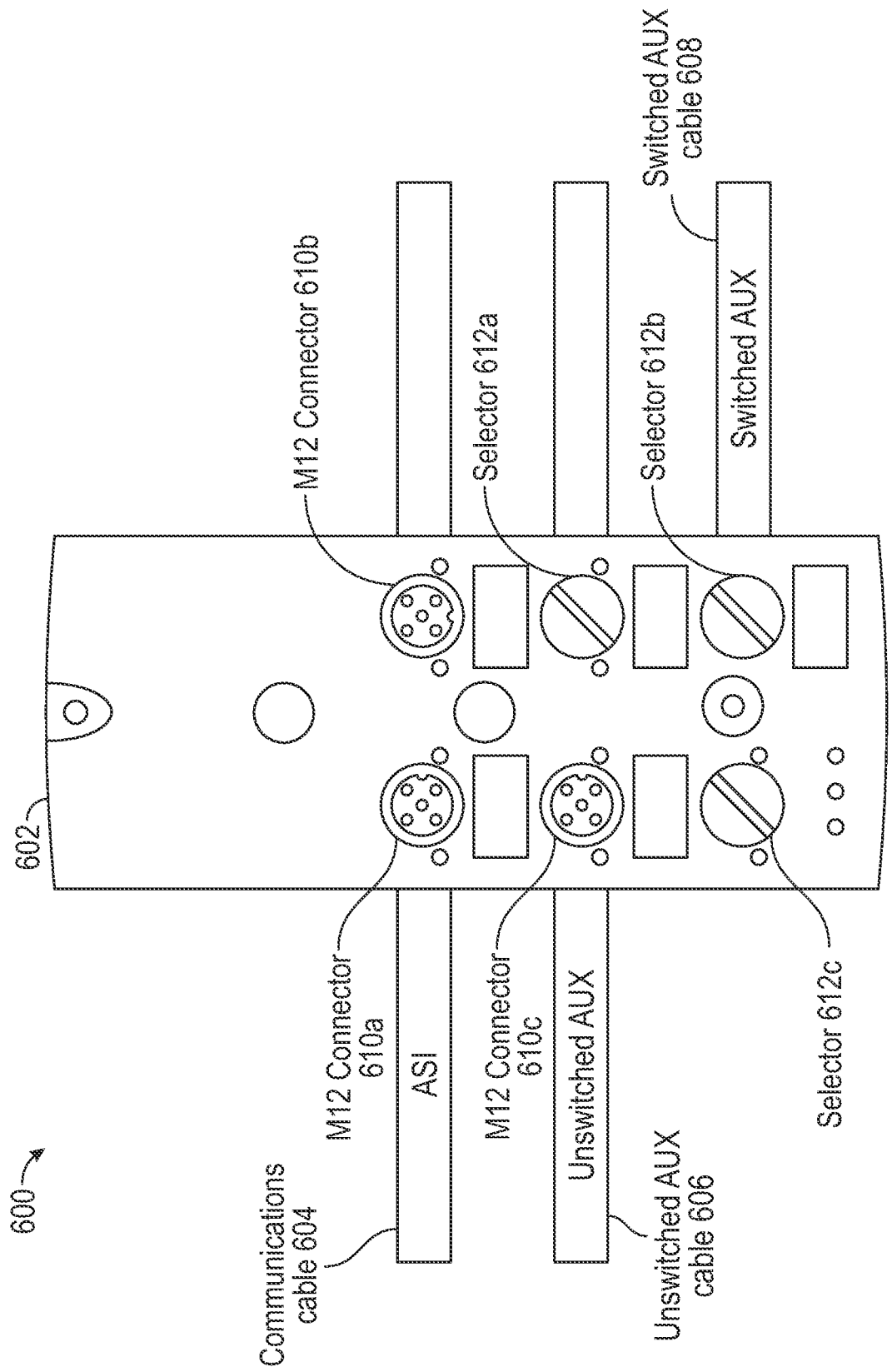
FIG. 6 is a block diagram of an exemplary ASi network module with a switching module for a network system in accordance with the present invention.

FIG. 6 illustrates an exemplary ASi network module 600 for a power switching module that includes the safety relay module 310 of FIG. 3A and is configured to couple to an unswitched AUX cable 606 and a switched AUX cable 608, where these cables (606, 608) are implemented as profile (flat) ASi cables. As illustrated in FIG. 6, an ASi communications cable 604 passes through the ASi network module 600. The unswitched AUX cable 606 also passes through the ASi network module 600, while the switched AUX cable 608 originates in the ASi network module 600 and extends outwardly from the ASi network module 600 (see FIG. 6). The ASi network module 600 is configured to couple internal components (e.g., a controller/processor and relay module with relays, such as the network controller 302 and relay module 310 of FIG. 3A) to respective ASi profile cables 604, 606, and 608.

Thus, the ASi network module 600 of FIG. 6 illustrates an exemplary network module configured to control the passage of power from the unswitched AUX 606 cable the switched AUX cable 608 (e.g., with the use of a controller and switching module, such as the network controller 302 and the safety relay module 310 of the network module 300). As discussed herein and like the network controller 302 of the network module 300, the controller of the ASi network module 600 comprises, for example, a processor or microprocessor, a memory, input/output devices, required circuitry, and software. The ASi network module 600 of FIG. 6 also includes M12 network connectors 610 for coupling signals/power from the Asi profile cables to other external destinations via cables with M12 network connectors. The network module 600 of FIG. 6 also includes control/selector knobs 612. For example, the network module 600 includes, for example, an address control/selector knob 612b and a selection knob 612c. Selector knob 612a may be utilized as a control or selector switch.

Figure 7:
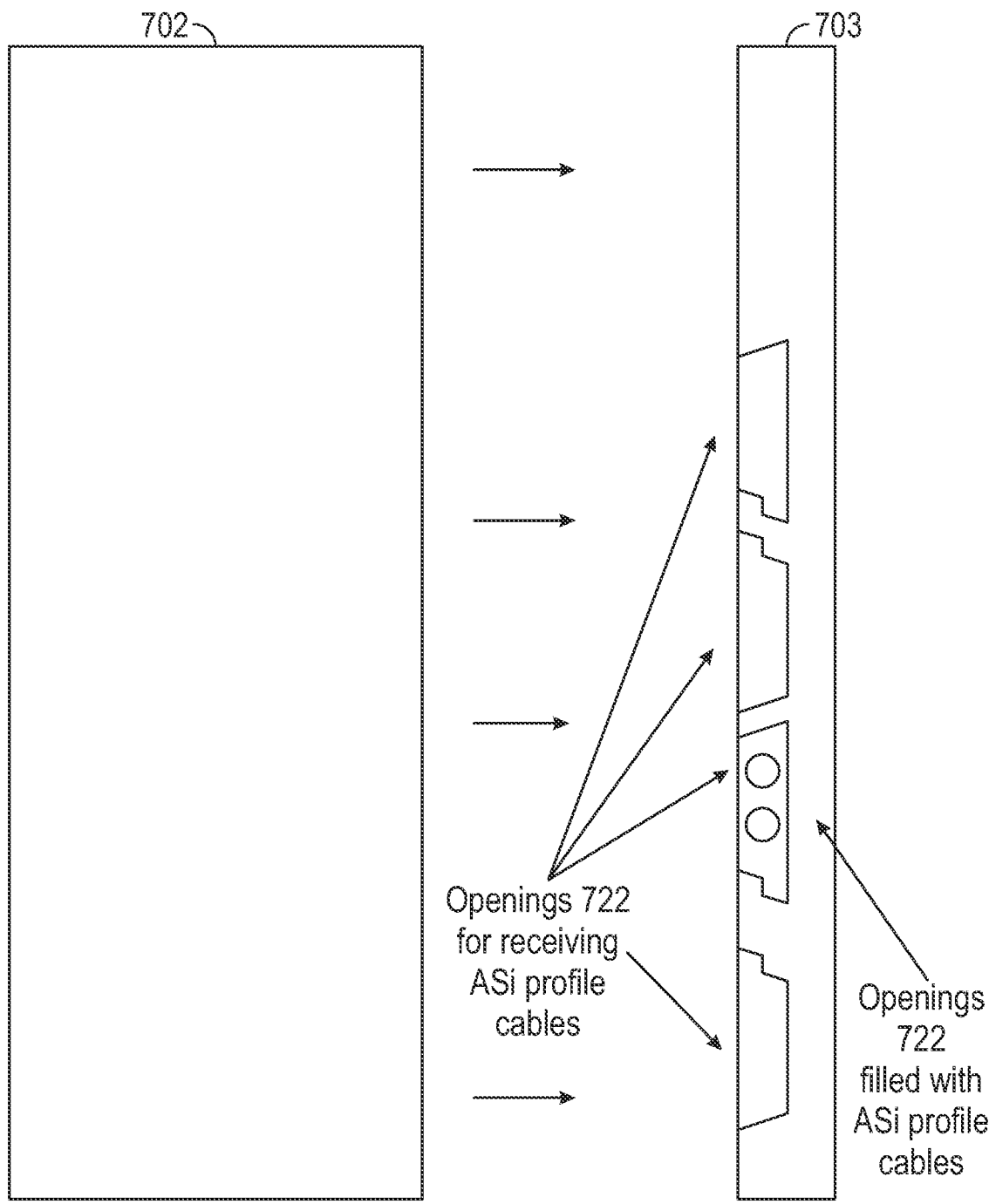
FIG. 7 is a side view of the ASi network module of FIG. 6 illustrating the coupling of a facing portion to a back plate of the ASi network module.

FIG. 7 illustrates a side view of an exemplary implementation of the Asi network module of FIG. 6. The Asi network module 700 of FIG. 7 includes a facing portion 702 (that includes an arrangement of select/control knobs and M12 network connectors, such as illustrated in FIG. 6) and a back plate 703. The Asi network module 700 is configured to couple internal components (e.g., a controller/processor and relay module, such as the network controller 302 and relay module 310 of FIG. 3A) to respective ASi profile cables. In one embodiment, coupling the facing portion 702 to the back plate 703 engages insulation displacement connectors with respective profile cables arranged within the back plate 703 (see FIG. 8). As illustrated in FIG. 7, the profile cables may be "keyed" (i.e., asymmetrically configured) such that they will fit within only certain matching ones of the openings 722 in the back plate 703. Such arrangement of profile cables can be used to provide an assurance that an incoming or outgoing communication signal is communicatively coupled to the appropriate communication network cable (e.g., communications cables 604a, 604b). Such arrangements may also be used to provide an assurance that the unswitched AUX cable 606 and the switched AUX cable 608 are placed within their proper openings 722 according to their polarity configurations. As illustrated in FIG. 7, a plurality of openings 722 are arranged in the back plate 703 of the ASi network module 700.

Figure 8:
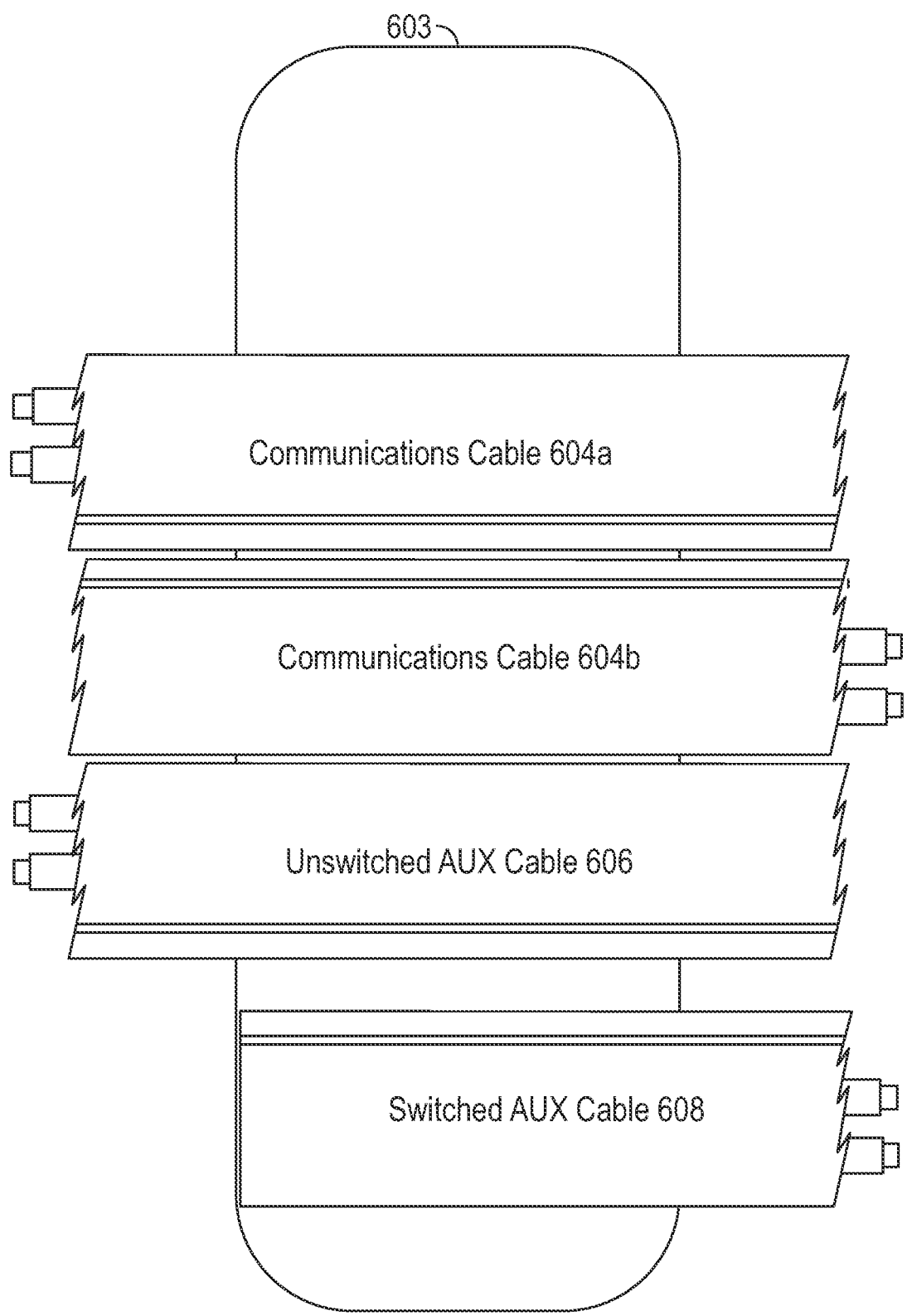
FIG. 8 is an interior view of the back plate of the ASi network module of FIG. 7 illustrating the placement of exemplary ASi network cables in accordance with the present invention.

The communications cables 604, the unswitched AUX cable 606, and the switched AUX cable 608 are illustrated in FIG. 8 as portions of cabling, each with stripped wires extending from the ends of the cables. Such exemplary stripped wires are illustrated to demonstrate the orientation of the wires within their respective asymmetric profile cables. See FIG. 4 for another illustration of the orientation of wires within a flat asymmetric profile cable.

Figure 9:
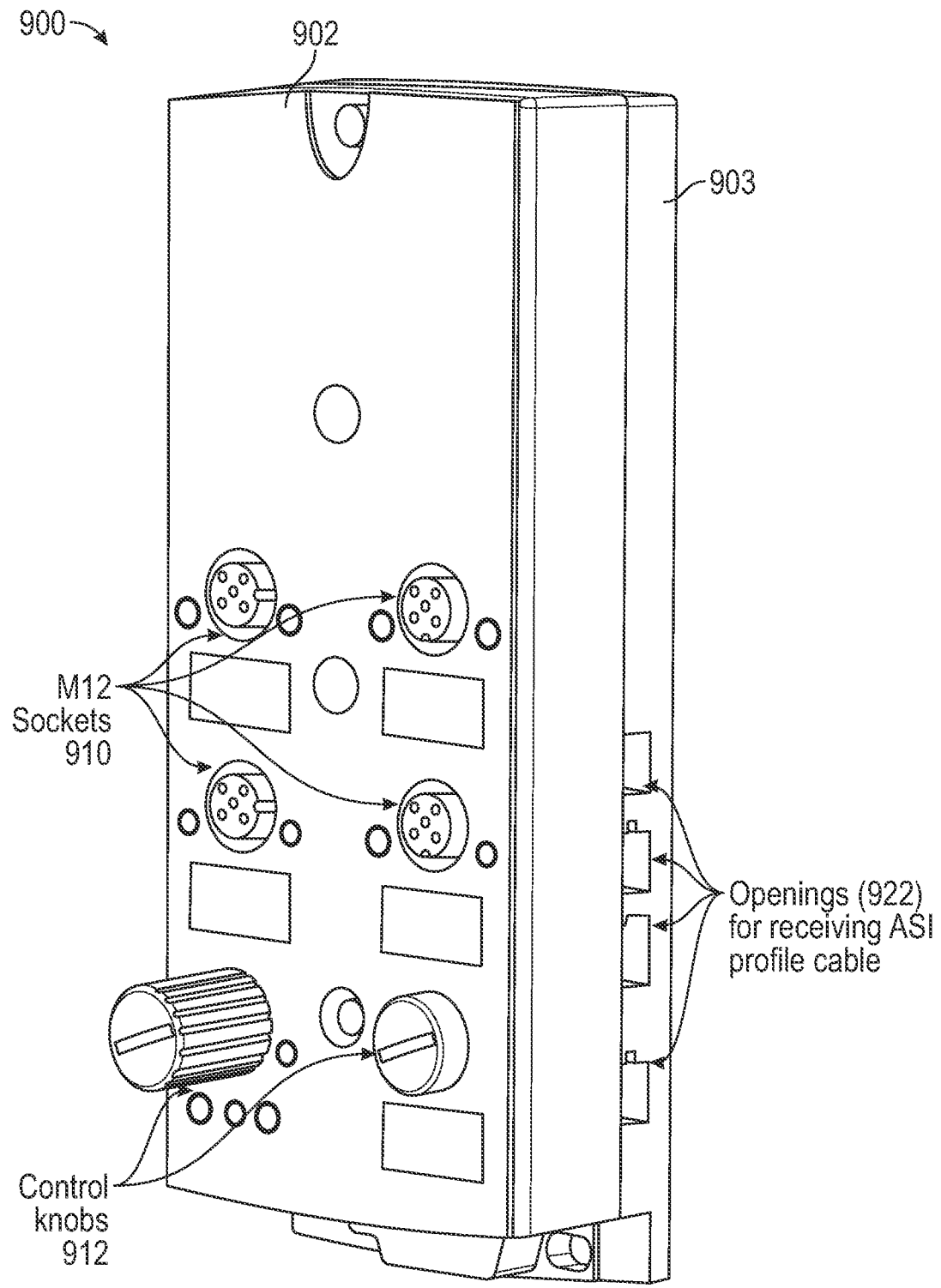
FIG. 9 is a perspective view of an exemplary ASi network module with a switching module for a network system in accordance with the present invention.

FIG. 9 illustrates a perspective view of an exemplary implementation of the ASi network module of FIG. 6. The ASi network module 900 of FIG. 9 includes a set of M12 network connectors 910 and control/select knobs 912 on a front surface of a facing portion 902 and a set of openings 922 arranged on the sides (of a back plate 903) for receiving and passing through asymmetric ASi profile (flat) cables. Note that the openings 922 are keyed such that the asymmetric cable is only received in a required orientation for proper polarity configurations (see FIG. 10). The ASi network module 900 is configured to couple internal components (e.g., a controller and relay module, such as the network controller 302 and relay module 310 of FIG. 3A) to respective ASi profile cables. As discussed herein, and like the network controller 302 of the network module 300, the controller of the ASi network module 900 comprises, for example, a processor or micro-processor, a memory, input/output devices, required circuitry, and software.

Figure 10:
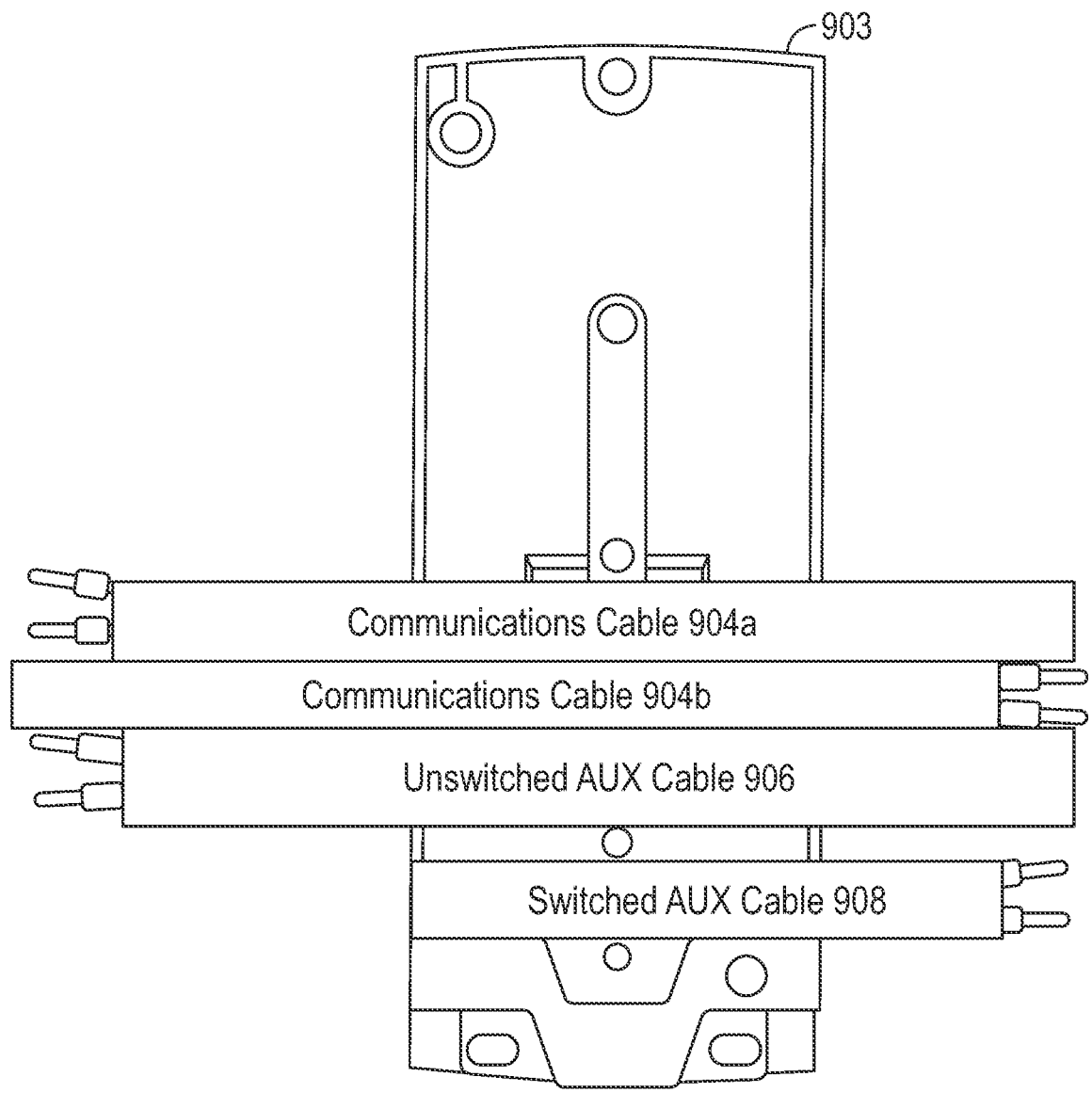
FIG. 10 is an interior view of a back plate of the ASi network module of FIG. 9.

FIG. 10 illustrates an interior view of the back plate 903 of the ASi network module 900 of FIG. 9, illustrating the placement arrangement of flat profile cables in the ASi network module 900. Note that because the exemplary ASi network cables are asymmetric profile cables, the cables will be running in only one direction for proper polarity configurations (e.g., there are two separate communications profile cables, each running in a different direction).

Thus, embodiments of the exemplary network module are configured to receive network cables (e.g., ASi profile network cables) and to couple to them using insulation displacement connections. That is, network cables may be utilized that allow for insulation displacement connections. The network module is configured to provide switched auxiliary (AUX) power for E-stop system functionality in a network system. The network module receives at least one communications cable and an unswitched AUX cable, as well as originating a switched AUX cable. The network module includes a controller and a switching module. The controller is configured to control the passage of power through the switched AUX cable by controlling the passage of power from the unswitched AUX cable to the switched AUX cable (via the switching module, which is coupled to interconnect power from the unswitched AUX cable to the switched AUX cable). The switching module is configured to control the passage of power through the switched AUX cable via control signals received from the controller. The exemplary insulation displacement connectors allow for an efficient coupling of signals/power to internal components without requiring the additional hardware and wiring needed to physically land the network cables in the network module.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A network module configured to provide switched auxiliary (AUX) power for emergency stop ("E-stop") system functionality in a network system, the network module comprising:
a switch assembly disposed within the network module, wherein the switch assembly controls a passage of power from an unswitched AUX cable through a switched AUX cable for E-stop functionality, wherein the switch assembly receives the switched AUX cable, wherein the network module receives the unswitched AUX cable as a pass-through cable such that the unswitched AUX cable enters, passes through, and exits the network module, and wherein the switch assembly is coupled to the unswitched AUX cable inside the network module to provide power to the switched AUX cable; and
a controller communicatively coupled to a communications cable, wherein the controller controls switching actions of the switch assembly as defined by switching instructions received via the communications cable to selectively control the passage of power from the unswitched AUX cable through the switched AUX cable.

2. The network module of claim 1, wherein the switch assembly controls the passage of power from the unswitched AUX cable to the switched AUX cable.

3. The network module of claim 1, wherein the communications cable is coupled to the controller via a first connection module, and wherein the network module receives the communications cable as a pass-through cable such that the communications cable enters, passes through, and exits the network module.

4. The network module of claim 3, wherein the unswitched AUX cable and the switched AUX cable are coupled to the switch assembly via second and third connection modules, respectively.

5. The network module of claim 4, wherein the connection modules couple the unswitched AUX cable and the switched AUX cable to the switch assembly and the communications cable to the controller via insulation displacement connections.

6. The network module of claim 1, wherein the switched AUX cable originates within the switch assembly of the network module and extends outward from the network module.

7. The network module of claim 1, wherein at least one of the unswitched AUX cable, the switched AUX cable, and the communications cable are configured as actuator sensor interface (ASi) cables.

8. The network module of claim 7, wherein the ASi cables are flat, asymmetric cables, each comprising a pair of wires.

9. The network module of claim 1, wherein the switch assembly comprises one or more relays, with each relay of the one or more relays control the passage of power through the switched AUX cable by selectively opening and closing.

10. A network module configured to provide switched auxiliary (AUX) power for emergency stop ("E-stop") system functionality in a network system, the network module comprising:
a controller and a switch assembly disposed within the network module;
wherein the controller controls switching actions of the switch assembly;
wherein the switch assembly controls a passage of power from an unswitched AUX cable through a switched AUX cable, wherein the switch assembly receives the switched AUX cable, wherein the network module receives the unswitched AUX cable as a pass-through cable such that the unswitched AUX cable enters, passes through, and exits the network module, and wherein the switch assembly is coupled to the unswitched AUX cable inside the network module to provide power to the switched AUX cable; and
wherein the switch assembly selectively controls a passage of power from the unswitched AUX cable to the switched AUX cable, as defined by a signal received from the controller.

11. The network module of claim 10, wherein the controller receives switching instructions for controlling the switch assembly via a communications cable that passes through the network module.

12. The network module of claim 11, wherein the communications cable is coupled to the controller via a first connection module, and wherein the network module receives the communications cable as a pass-through cable such that the communications cable enters, passes through, and exits the network module.

13. The network module of claim 12, wherein the unswitched AUX cable and the switched AUX cable are coupled to the switch assembly via second and third connection modules, respectively.

14. The network module of claim 13, wherein the connection modules couple the unswitched AUX cable and the switched AUX cable to the switch assembly and the communications cable to the controller via insulation displacement connections.

15. The network module of claim 10, wherein the switched AUX cable originates within the switch assembly of the network module and extends outwards from the network module.

16. The network module of claim 10, wherein the unswitched AUX cable, the switched AUX cable, and the communications cable are configured as actuator sensor interface (ASi) cables.

17. The network module of claim 16, wherein the ASi cables are flat, asymmetric cables, each comprising a pair of wires.

18. The network module of claim 10, wherein the switch assembly comprises one or more relays, with each relay of the one or more relays control the passage of power through the switched AUX cable by selectively opening and closing.

19. A method for providing switched auxiliary (AUX) power for emergency stop ("E-stop") system functionality in a network system, the method comprising:
providing a network module with a switch assembly disposed within the network module;
controlling switching actions of the switch assembly;
receiving with the network module an unswitched AUX cable, wherein the unswitched AUX cable enters, passes through, and exits the network module;
receiving with the switch assembly a switched AUX cable;
coupling the unswitched AUX cable to the switch assembly as the unswitched AUX cable passes through the network module to provide power to the switched AUX cable; and
selectively controlling the passage of power from the unswitched AUX cable to the switched AUX cable by controlling the switching actions of the switch assembly.

20. The method of claim 19, wherein the unswitched AUX cable and the switched AUX cable are coupled to the switch assembly via respective insulation displacement connections.

21. The method of claim 19, wherein the switching actions of the switch assembly are controlled as defined by switching instructions received via a communications cable, wherein the communications cable enters, passes through, and exits the network module.

* * * * *